United States Patent
Rivers (10) Patent No.: US 6,535,963 B1
(45) Date of Patent: Mar. 18, 2003

(54) MEMORY APPARATUS AND METHOD FOR MULTICAST DEVICES

(75) Inventor: James P. Rivers, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/345,709

(22) Filed: Jun. 30, 1999

(51) Int. Cl.[7] .............................................. G06F 12/00
(52) U.S. Cl. ........................ 711/149; 711/131; 711/154; 365/189.01; 365/220; 365/233
(58) Field of Search ................. 709/213, 214, 709/215; 710/52, 53, 54, 56, 310, 316, 309, 240, 241, 242; 711/147, 149, 153, 154, 156, 170, 171, 172, 173, 131, 157; 365/189.01, 220, 230.05, 233

(56) References Cited

U.S. PATENT DOCUMENTS

| | | | | |
|---|---|---|---|---|
| 4,158,235 A | * | 6/1979 | Call et al. | 365/49 |
| 4,807,189 A | * | 2/1989 | Pinkham et al. | 365/189.05 |
| 5,043,947 A | * | 8/1991 | Oshima et al. | 365/230.03 |
| 5,089,992 A | * | 2/1992 | Shinohara | 365/51 |
| 5,619,500 A | | 4/1997 | Hiekali | |
| 5,634,046 A | | 5/1997 | Chatterjee et al. | |
| 5,640,597 A | | 6/1997 | Noguchi et al. | |
| 5,717,646 A | * | 2/1998 | Kyi | 365/230.05 |
| 5,805,590 A | | 9/1998 | Gillard et al. | |
| 5,838,994 A | * | 11/1998 | Valizadeh | 370/236 |
| 5,848,019 A | * | 12/1998 | Matthews et al. | 365/230.06 |
| 6,091,707 A | * | 7/2000 | Egbert et al. | 370/229 |
| 6,108,335 A | * | 8/2000 | Ganmukhi et al. | 370/395.7 |
| 6,108,692 A | * | 8/2000 | Van Seters et al. | 709/213 |
| 6,122,218 A | * | 9/2000 | Kang | 365/230.05 |
| 6,278,711 B1 | * | 8/2001 | Ganmukhi et al. | 370/395.1 |
| 6,282,589 B1 | * | 8/2001 | Porterfield et al. | 710/310 |
| 6,314,501 B1 | * | 11/2001 | Gulick et al. | 711/153 |

OTHER PUBLICATIONS

16Mbit Enhanced DRAM Family 4Mx4, 2Mx8, 1Mx16 Preliminary; copyright 1998 Enhanced Memory Systems Inc.

FM1608 64Kb Bytewide FRAM® Memory Preliminary; copyright Ramtron International Corporation; Jan. 6, 1999.

* cited by examiner

Primary Examiner—Do Hyun Yoo
Assistant Examiner—Christian P. Chace
(74) Attorney, Agent, or Firm—Hickman Palermo Truong & Becker LLP (57) ABSTRACT

A memory system usable for a multi-casting switch or similar device includes memory which can be dynamically allocated among two or more output ports. The memory includes a plurality of severally addressable subarrays with the subarrays being dynamically associated with various output ports as the need arises. When a received frame is to be output from two or more output ports in a multi-casting fashion, the frame is written in parallel to two of the subarrays associated respectively with the output ports. Frames are written in the subarrays in the order in which they are to be read-out and providing a certain degree of inherent queuing of the stored frames, reducing or eliminating the need for pointers to achieve the desired output order.

11 Claims, 6 Drawing Sheets

| SUB-ARRAY 512 | FREE? 514 | ASSOCIATED WITH 516 | REMAINING UNUSED BUFFERS 518 | READ POINTER CURRENT ADDRESS 522 | WRITE POINTER CURRENT ADDRESS 524 |
|---|---|---|---|---|---|
| 312a | Y | — | | 00000 | 00000 |
| 312b | N | 326b | 4 | $R_b$ | $W_b$ |
| 312c | N | 326a | 7 | $R_c$ | $W_c$ |
| 312d | Y | | | | |
| ⋮ | | | | | |
| 312i | Y | — | | 00000 | 00000 |
| 312j | N | 326a | 0 | $R_j$ | $W_j$ |
| 312k | N | 326c | 1 | $R_k$ | $W_k$ |
| ⋮ | | | | | |

FIG. 5

| OUTPUT PORT | SUB-ARRAY WHERE OLDEST DATA IS LOCATED 612 |
|---|---|
| 326a | 312j |
| 326b | 312b |
| 326c | 312k |
| 326d | — |

MEMORY APPARATUS AND METHOD FOR MULTICAST DEVICES

FIELD OF THE INVENTION

The present invention relates to a memory apparatus and method of a type which can be useful for devices used in multicasting and in particular to a memory configuration for a network or other switch or similar device which can provide data to two or more output ports.

BACKGROUND OF THE INVENTION

Many systems and devices are configured to impart the capability of multicasting in which a data stream or other signal is received and is output to two or more output ports. One example is a network switch which typically has multiple input ports and multiple output ports. In many situations, it is desired to provide a signal received on one of the input ports to two or more of the output ports, thus providing a form of multicasting.

Typically, multicasting devices, including switches, may include memory which stores some or all of the data received on the input ports before the data is then output through the output ports. Such data can provide useful buffering when it is desired to, for example, store portions of the data destined for a particular output port (or ports) during the time that other data is being output to different output ports. Such buffering memory can also be useful for accommodating varying data rates and the like.

Characteristics of such memory can affect the cost and/or performance of the switch or similar device. Other factors being equal, the cost of the switch will increase as the amount of memory provided in the switch increases. The amount of memory which is provided is a function not only of the characteristics of the data (and the data rates) to be received and transmitted, but is also a function of how efficiently the memory is used (for example, whether the memory is configured in such a way that it is necessary to provide a relatively large amount of memory to accommodate situations that may only rarely occur, such that during the majority of the time the device is being used, most of the memory may be superfluous). Cost and performance can also be affected by bandwidth of the memory and/or related components. Cost and/or performance can be adversely impacted if a particular memory configuration means that a relatively large bandwidth is required to perform memory reads or writes. Bandwidth considerations have been particularly problematic in systems which, as has been most typically the situation, the entire memory system is relatively less-integrated, such as when a memory system is provided by coupling (typically commoditized) memory arrays (provided on one or more discrete chips) to certain control (or other) circuitry, often on other chips, requiring buses or similar devices for carrying the bandwidth necessary to achieve read and write operations.

In typical previous systems, certain factors such as memory size and bandwidth requirements were at least partially in opposition, in the sense that systems which were configured for efficiency of memory use (thus requiring smaller memory arrays) typically achieved this benefit at the price of a relatively higher bandwidth (for at least some components of the system). Accordingly, it would be useful to provide a memory configuration which can achieve relatively high efficiency (i.e. avoid the need for memory which may be unused much of the time) without increasing bandwidth requirements to an undesirable or unacceptable level.

SUMMARY OF THE INVENTION

The present invention provides for a memory configuration with relatively high usage efficiency while avoiding a substantial increase bandwidth requirements. In one embodiment, the memory array is subdivided into subarrays, each subarray being individually addressable and controllable (such as read/write controllable). Such a configuration facilitates parallel writes such as storing two copies of a frame (or other data portion), e.g. in two separate subarrays when the frame is destined for two output ports. The subarrays, in this way, can be associated with the various output ports, preferably in a dynamic fashion so that the total available amount of memory can be allocated to the various output ports as needed. This provides enhanced usage efficiency since there is no need to allocate the maximum anticipated required memory for each of the output ports. Rather, a "pool" of memory subarrays is provided sufficient to accommodate the anticipated memory requirements of the system as a whole (rather than for each output port) and subarrays can be dynamically allocated from the pool as needed.

Furthermore, the size of the subarrays can be selected different from frame sizes, if desired. This provides the ability to allocate memory with a granularity different from frame sizes (e.g. to allocate subarrays large enough to hold several frames) which reduces the size and complexity of the pointer or other buffer management system, contributing to a smaller requirement for read/write bandwidth.

Preferably, each subarray can store several frames. By configuring the system to always store the frames in the proper order within a subarray, there is an inherent queuing capability, i.e. at the proper time, frames may be output to the proper output port from a given subarray simply in the order in which they are stored, without the need for storing and managing a pointer for every buffer. The inherent queuing capability provided in subarrays having a larger granularity than one frame reduces the read/write bandwidth requirements.

Preferably, the present invention exploits opportunities presented by more highly integrated memory systems (so-called "embedded memory") which can more easily accommodate a memory system configured as described herein than previously commonly-used commoditized memory. Thus, according to one embodiment, the present invention exploits opportunities presented by the availability of embedded memory by configuring a system which can provide parallel writes to subarrays, dynamic subarray allocation, multi-frame subarray granularity and/or inherent frame queuing to provide a system which has relatively high usage efficiency of memory without commensurately high read/write bandwidth requirements.

DETAILED DESCRIPTION

Before describing features of the present invention, certain aspects of previous systems will be described. As show in FIG. 1, in the traditional shared memory system, a main memory array 112 is able to store a plurality of frames (or other data portions or packages) and can be configured to facilitate dynamic allocation by storing the frames in a plurality of frame buffers (which may be nothing more than a range of memory cells large enough to accommodate a frame and any header or trailer information). Typically, the main memory array 112 is a commoditized memory, i.e. a memory array substantially identical to memory which is used for many different types of purposes. Typically the memory 112 is read and written in the standard fashion such as providing an address 116 to address decoders 118 and providing read/write data to sense amps (or write latches) 122 so that data being written or read is stored or retrieved in memory locations of the array 112 which are specified by the address 116. Typically, memory cells are addressed by a row address and a column address. Because a single address 116 is delivered, e.g. to all the rows (with only the row which matches the current row address being "activated" to perform the read or write operation, via the address decoder for that row) it is infeasible to perform parallel writes, such as writes to two or more rows, at the same time. Accordingly, in a typical shared memory system, when it is desired to provide a frame, received at 1 of the input ports 124a,b,c,d, for distribution to two or more of the output ports 126a,b,c,d, it is infeasible to store two copies of that frame in two different frame buffers (each associated with a different output port), since this would require performing two sequential write operations, unacceptably slowing operation of the system. Instead, in the device of FIG. 1, each output port 126a,b,c,d is associated with an output port pointer queue 128a,b,c,d. Thus, when a frame is to be output to two different outport ports, a pointer to the frame buffer where that frame is stored, is placed in the (logical) bottom of each pointer queue associated with the target output ports for that pointer queue. A frame write allocation logic circuit 132 receives information about incoming frames, and outputs information to the pointer queue 128a,b,c,d controlling the storing of such pointers. The write frame allocation circuit 132 also provides address and control information to the memory array 112 to control where the incoming frame is stored (i.e. in which buffer it is stored). The frame data itself is provided to sense amps 122 for writing to the addressed frame buffer. In order for the output queues 128a–d to store the new pointer at the correct position within the pointer queue, each queue also has its own write pointer 134a,b,c,d. When it is desired to output data from the various ports 126a,b,c,d, the (logical) "top" of the pointer queue 128a,b, c,d (as indicated by a queue read pointer 136a,b,c,d) causes the address pointer at the top of the respective pointer queue to be provided as a read address 116 to the memory array 112 for output via sense amps 122 and arbitration logic 125 to the output ports 126a–d for output therefrom. Arbitration logic 125 is typically provided because, just as there cannot be parallel writes to the memory 12, there also cannot parallel reads, i.e. only one frame buffer at a time is output to one or more target output ports associated with that frame. Thus it is necessary to determine which output port is to receive the next frame for outputting. Arbitration 125 can be by any of the number schemes such as a round robin scheme, a weighted priority scheme and the like.

Figure 1:
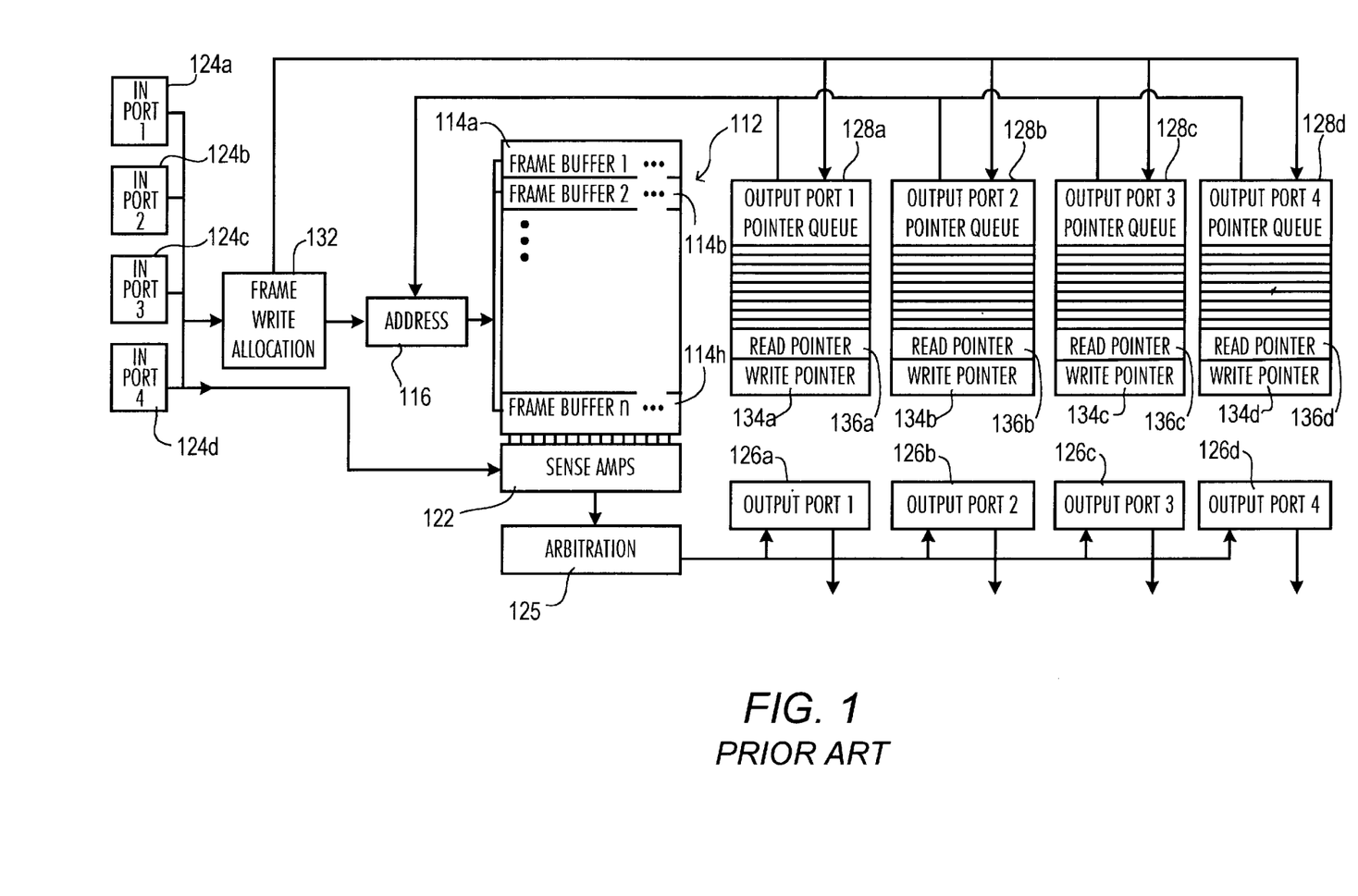
FIG. 1 is a block diagram of a shared memory system according to previous devices.

One of the positive features of the configuration of FIG. 1 is that the frame buffers 114a, 114n are not necessarily permanently associated with particular output ports. The association between frame buffers and output ports is established, as needed, by the pointers in the pointer queues. Thus, if, during a particular period of time, a particular output port is relatively inactive, while another output port is as a relatively high traffic level, the system can be configured to associate a relatively large portion of the frame buffers 114a, 114n with the more active port. Similarly, if, at a later time the situation changes, the number of frame buffers associated with respective ports can be reallocated (by storing pointers in the queues associated with the more active output port). In this way, when it is decided how much total memory 112 to provide, there is no need to provide a memory 112 which is large enough to have frame buffers available for all the output ports operating at the maximum anticipated traffic level, simultaneously. Rather, the memory 112 need only have enough frame buffers space to accommodate the highest traffic level of the memory system as a whole (rather than on a port-by-port basis).

Although the system of FIG. 1 can be configured to provide relatively efficient use of the memory array 112, (so as to avoid providing memory which may be unused during a relatively high portion of the time), it is found, in use, that shared memory systems of the type shown in FIG. 1 can have relatively high bandwidth requirements for read/write operations. This is believed to be due, in large part, to the pointer queue system described above. Although for purposes of the present discussion, the system depicted in FIG. 1 is somewhat simplified compared to a real memory system, it nevertheless illustrates that the pointer queue system requires maintaining four separate queues which are constantly changing, each of which requires it own read and write pointer, and thus requires a relatively large bandwidth for the system to operate.

Figure 2:
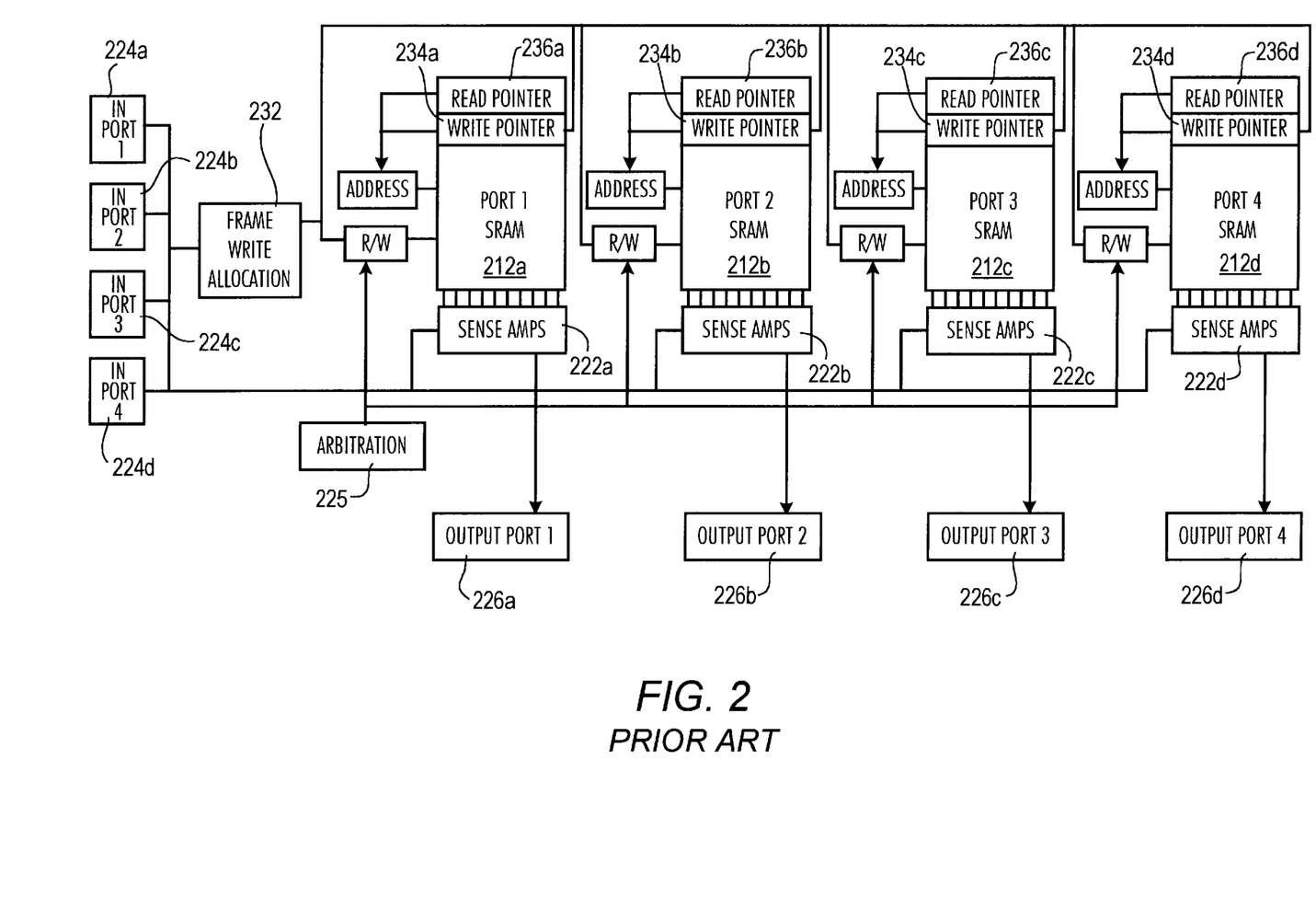
FIG. 2 is a block diagram of a port-buffered memory system according to previous devices.

The bandwidth drawback of the system of FIG. 1 is at least partially addressed by the port-buffered memory system of FIG. 2. A major feature of the system of FIG. 2 is that a predefined amount of memory 212a,b,c,d (e.g. static random access memory or SRAM in the configuration of FIG. 2) is permanently associated with each of the output ports 226a,b,c,d. Each frame, as it arrives at the input ports 224a,b,c,d results in providing address and control signals, via frame write allocation logic circuitry 232, to cause the frame to be written to the (logical) bottom of the memory or memories associated with one or more output ports 226a–d which are the target for that frame. The address of the (logical) bottom of the port memory stack is provided by a write pointer 234a–d associated with each port memory 212a–d. Read arbitration or similar logic 225 provides read control signals and causes read pointers 236a,b,c,d to deliver read addresses from the (logical) top of the port memories 212a,b,c,d, for outputting via sense amps 222a,b,c,d to the respective output ports 226a,b,c,d. As can be seen from FIG. 2, there is no need, in this system, for a separate pointer queue memory or for the logic and read/write operations associated with such queues. Instead, the ability to perform parallel writes to the separate port memories 212a,b,c,d and the consequent ability to provide each port memory 212a, b,c,d as an inherent output queue (i.e. with frame buffers stored in the same (logical) order in which they are to be output) makes it possible to dispense with separate pointer queues of the type shown in FIG. 1. However, because the system of FIG. 2 provides a separate memory 212a,b,c,d permanently associated with each output port 226a,b,c,d, there is no opportunity to allocate under-utilized memory space in one of the memories for use in connection with a higher-traffic (different) output port. Accordingly, because it is typically not known in advance which output port will have the highest traffic, and since traffic patterns may change through time, each port memory 212a,b,c,d must have sufficient capacity to store enough frames to accommodate the highest anticipated traffic for that port, even though the highest anticipated traffic may occur only during limited periods time, and may occur during periods of time when the port memory for other ports is being underutilized.

Thus, as illustrated in FIGS. 1 and 2, previous multicasting systems, and in particular systems such as network switches, could be configured to provide relatively higher memory utilization, but at the cost of relatively higher bandwidth, or could be configured to reduce bandwidth requirements, but at the cost of lower use-efficiency of the memory arrays, thus requiring provision of more memory than theoretically necessary.

Figure 3:
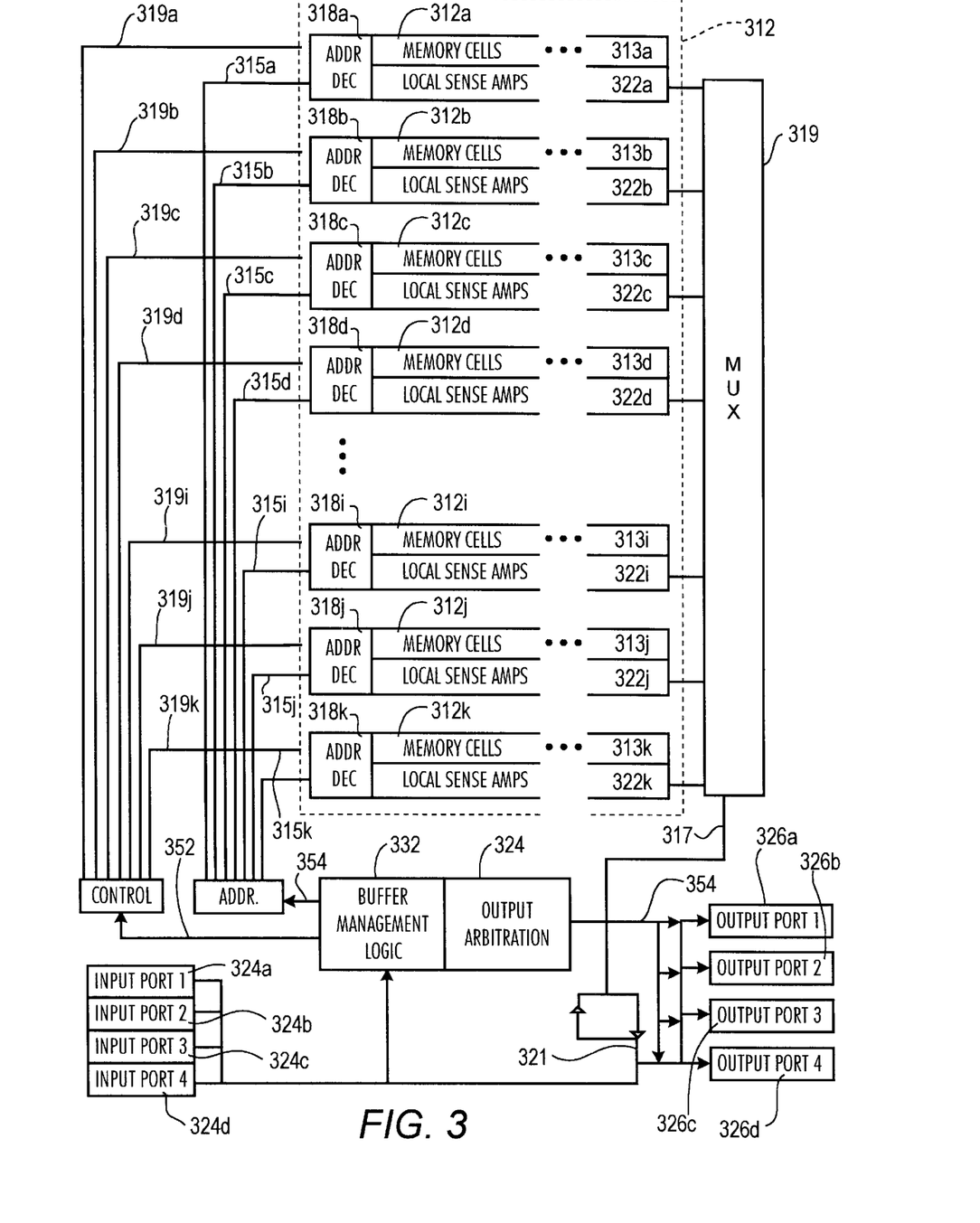
FIG. 3 is a block diagram of a memory system according to one embodiment of the present invention.

FIG. 3 illustrates a memory system according to an embodiment of the present invention which provides both the ability to dynamically allocate memory space for the various output ports, as needed (thus providing a relatively high use-efficiency), but without incurring the type of bandwidth needed in the system of FIG. 1, e.g. by providing the ability to perform parallel writes and/or to provide inherent queuing, thus eliminating an elaborate pointer queue system).

In the system of FIG. 3, a memory array 312 is formed of a plurality of subarrays 313a,b,c,d,i,j,k, each with an associated address decoder 318a,b,c,d,i,j,k and its own set of local sense amps a,b,c,d,i,j,k. Unlike the shared memory system of FIG. 1, the memory 312 shown in FIG. 3 provides separate address lines 315,b,c,d,i,j,k to each subarray, so that it is not necessary to output the same address to all rows in the memory array 312 at any given time. This provides the ability to perform parallel writes to different subarrays 313a,b,c,d,i,j,k. As will be understood by those of skill in the art, after understanding the present disclosure, the present invention can be implemented using any of a plurality of addressing schemes, including, e.g., unique addressing or any of a plurality of row/column addressing schemes, such as providing unique row addresses and shared column addresses, and the like.

Unlike the system of FIG. 2 (in which data read from any one port memory 212a,b,c,d was always provided to the same output port 226a,b,c,d), the embodiment depicted in FIG. 3 provides the ability, e.g. using a global sense amp/multiplexer 319, to route the data 317 read from any of the subarrays 313a,b,c,d,i,j,k, to any desired one or ones of the output ports 326a,b,c,d. This combination of abilities permits the memory subarrays 313a,b,c,d,i,j,k to be dynamically allocated without requiring the elaborate pointer queue system of FIG. 1. The ability to determine whether the (typically multiple) frame buffers stored in a given one of the subarrays 313a,b,c,d,i,j,k, are to be read-out to the first port 326a, the second port 326b, the third port 326c or the fourth port 326d means that when a particular port is more active, additional subarrays 313a,b,c,d,i,j,k can be (temporarily) associated with the more active port while, at a later time, those same subarrays may be reused by associating them with a different port which may be more active at a later time. The ability to perform parallel writes means that each memory array 313a,b,c,d,i,j,k can act as an inherent queue, i.e. without the need for storing a separate pointer for each frame to be output from each port. Rather, in one embodiment, for each subarray 313a,b,c,d,i,j,k a flag (or implicit information) indicates whether the subarray is free, and a pointer points to the next subarray in the logical subarray chain. For each port, a single read pointer and a single write pointer are provided (which can also store an indicator of the subarray and/or an absolute index into the subarray). This system suffices to define the (logical) top and (logical) bottom of the stack of frames stored in the respective subarrays. It is anticipated that, in some embodiments, a linked list system can assist, e.g. in buffer management.

Figure 4:
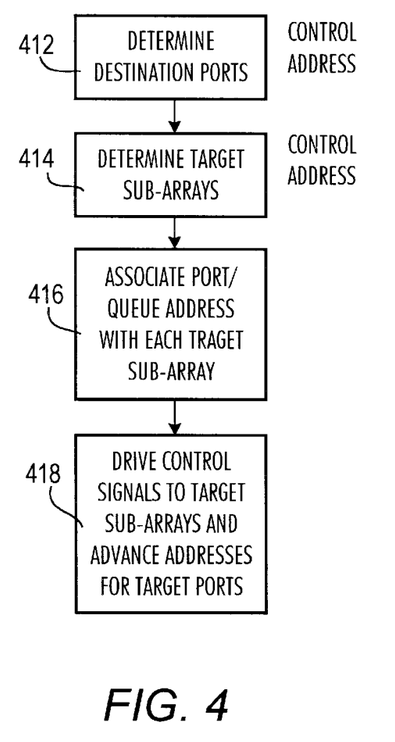
FIG. 4 is a flow chart depicting a write procedure according to an embodiment of the present invention.
Figure 5:
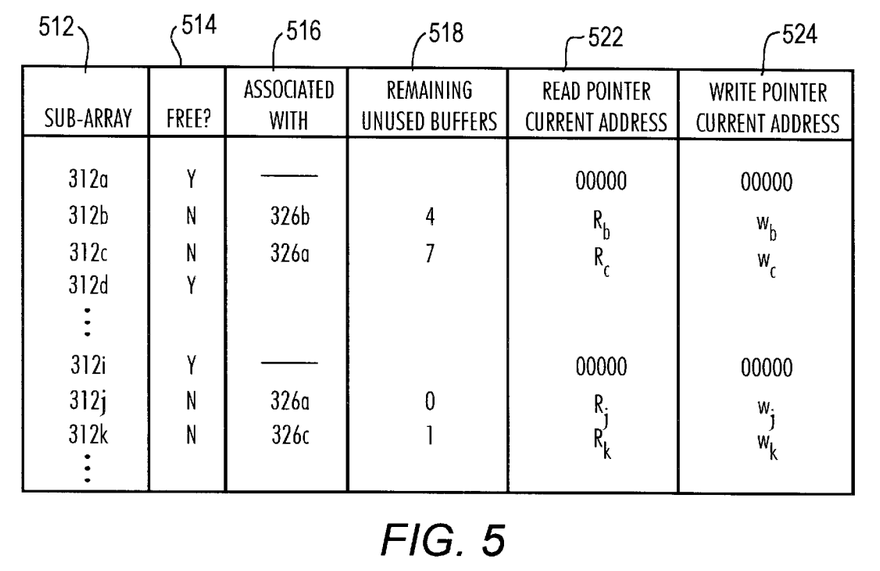
FIG. 5 is an illustration of a table storing information for use in an embodiment of the present invention.

In use, as a frame arrives at one of the input ports 324a,b,c,d, information about this event is provided to buffer management logic 332. Buffer management logic 332 also has information, e.g. from a switching table, switch CPU or the like (not shown) indicating how the frame destination (typically indicated in a frame header or trailer) corresponds to various output ports 326a,b,c,d. Using this information, the buffer management logic 332 can determine the target or destination port 326a,b,c,d or ports for each frame as it arrives 412 (FIG. 4). The buffer management logic 332 also has access to information (such as information stored in tables accessible to the buffer management logic) indicating which of the memory subarrays 313a,b,c,d,i,j,k are currently free (i.e. are not currently being used to store frames which have not yet been output) and, of the remaining subarrays, which output port each of those subarrays is associated with, and how many, if any, unused frame buffers remain in that subarray (or at least whether there are any remaining unused buffers in a subarray). FIG. 5 illustrates, in graphic form, a table containing this information. Those of skill in the art will understand how to construct and use memory for storing table information illustrated in FIG. 5.

Using the information in FIG. 5, the buffer management logic 332 can determine in which subarray or subarrays 313a,b,c,d,i,j,k the newly-arrived frame should be stored. For example, if it is assumed that a new frame arrives at input port 324b with a header indicating a destination which is associated with output port 326c, the buffer management logic 332, using the information shown in table 5, can determine that there is only one subarray currently associated with output port 326c, namely subarray 312k. Moreover, as shown in FIG. 5, there is still one remaining unused frame buffer in subarray 312k. Accordingly, frame management logic 332 outputs control and address information 352, 354 for causing the frame to be stored in the last unused buffer of subarray 312k (e.g. by sending a write signal on the control lines, and sending the current write pointer address $W_K$ on the address line 315k associated with the subarray 313k). Buffer management logic 332 will also cause the table of FIG. 5 to be updated, indicating that there are zero remaining free buffers in subarray 312k and resetting the write pointer address to zero. As another example, if it is supposed that the next stream arrives at input port 324d with a header indicating a destination associated with both output port 1 326a and output port 4 326d, the buffer management logic 332, consulting FIG. 5, will determine that there are two subarrays currently associated with output port 326a, namely subarrays 312j and 312c. However, of these two subarrays, only one has any remaining unused buffers, namely 312c. Furthermore, as shown in FIG. 5, there are currently no subarrays associated with the fourth output port 326d. Accordingly, the buffer management logic 332 will establish a new association, selecting one of the subarrays currently indicated as being "free", such as subarray 312a, with output port number 4 326d by storing the appropriate information in table 516. At the same time, the remaining unused buffers will be set at the maximum number of buffers minus 1 (to reflect the writing of the current buffer), and the logic will set the "free" flag 514 to "no". In this way, a new port queue address is associated with a target subarray 416. The buffer management logic 332 will then drive a appropriate write signal on the write lines or control lines 319a, 319c associated with subarrays 313a, 313c and will provide write pointer current addresses 000 and $W_C$, respectively, on the address lines 315a, 315c associated with the subarrays 313a, 313c, where the recently-received frame is the be written, thus achieving a parallel write. Following driving of the signals to cause such write, the table (FIG. 5) values will be advanced, e.g. by incrementing the write pointer associated with the subarrays 312a, 312c and updating the remaining unused buffer information 518.

If the third frame arriving, in this example, happens to be a frame with a destination associated with the third output port 326c, it will be seen from FIG. 5 that (as a result of the first frame in the example described above) the subarray 312k currently associated with output port 326c has no remaining unused buffers and accordingly, it will be necessary to allocate a new one of the free subarrays, such as subarray 312d, by associating it with output port 326c, substantially as described above. Thus, it can be seen that the present system, by allocating new subarrays as they are needed, will result in dynamic allocation of memory resources, i.e. will associate more subarrays with those output ports that have a need for more memory, e.g. to accommodate higher traffic at any given time.

An output arbitrator 324 will determine when data is to be read out of the memory 312 and to which the output ports 326a,b,c,d,e read-out frames will be provided. In the depicted embodiment, reads from the memory 312 can not be performed in parallel, i.e. it is not possible to read data from one of the subarrays at the same time that other data is being read out from the different subarray. The arbitration logic 324 determine which output port will provide output at which times. A number of arbitrations schemes can be used, as will be understood by those of skill in the art, including round robin schemes, weighted schemes, priority schemes and the like. Suppose, for example, that the output arbitration 324 determines that a frame is to be output from output port 2. The output arbitrator 324 determine which of the subarrays associated with output port 326a, contains the oldest data, i.e. the data which is to be next-output from output port 1 326a. Although, as will be understood by those of skill in the art, there are various possibilities for obtaining this data in the illustration of FIG. 6, this information is stored in a table. Using information from the table of FIG. 6, the output arbitrator 324 determines 612 that the oldest data associated with output port 1 is contained in subarray 312j. The output arbitrator 324 then obtains the read pointer (or current address) corresponding to subarray 312j, namely $R_j$ and provides this address 354 for outputting on the address line 315j associated with the proper subarray 313j. This causes data from the proper address in subarray 313j to be provided (via local sense amps 322j) onto the tri-state bus 321 whence it will be routed under control of the arbitrator 354 so that it is provided to output port 1 326a, as desired.

Figure 6:
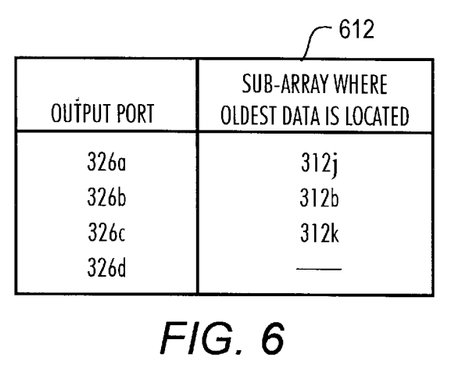
FIG. 6 is an illustration of a table storing information for use in an embodiment of the present invention.

When frame is read-out in this manner, buffer management logic 332 will update the tables (FIGS. 5 and 6). For example, after a frame has been read-out, the read pointer current address 522 is advanced to show the new address of the logical "top" of the stack in the associated subarray 512 and "the remaining unused buffers" value 518 is incremented. The indicator of the subarray where the oldest data is located 612 may be updated if needed. If the read operation results in reading the last frame stored in a particular subarray, (so that the subarray no longer stores any frames which have not yet been read-out), the free-flag 514 will be set to "yes". The port association 516 may be erased or invalidated and the write pointer 524, if desired, may be set to zero. In this way, subarrays which have been completely read-out can be returned to a pool of subarrays indicated as "free" 514 to be allocated to output ports as needed.

The memory 312 thus differs from previous memory systems of FIGS. 1 and 2 and typically would be implemented using memory other than standard commodotized memory chips. In one embodiment, the present invention is implemented providing both the memory subarrays 312 and some or all of the logic 332, 324 and individual address lines 315a,b,c,d,i,j,k on a single chip or integrated circuit such as forming all or part of so-called embedded memory.

Figure 7:
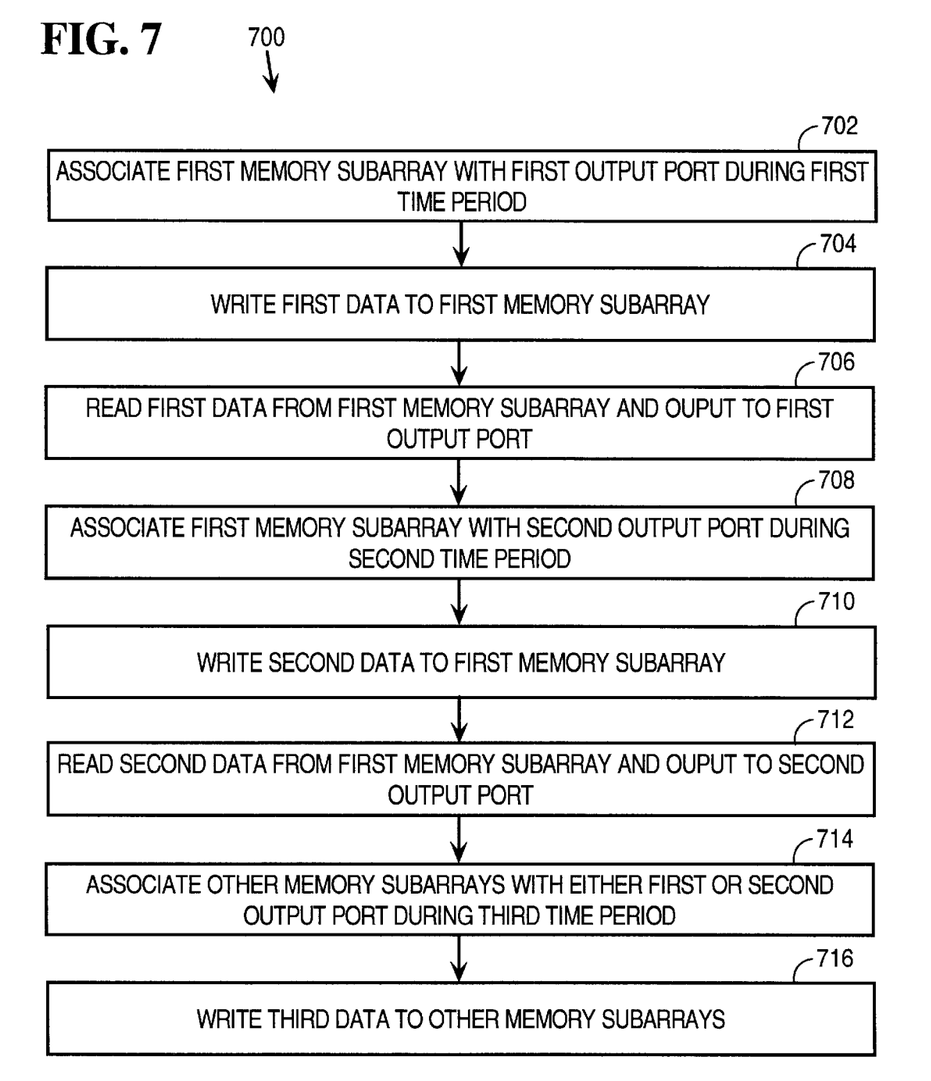
FIG. 7 is a flow diagram that depicts an approach for switching data in a main memory array having a plurality of memory subarrays, where each memory subarray has a separate address decoder and sense amp arrays.

FIG. 7 is a flow diagram 700 that depicts an approach for switching data in a main memory array having a plurality of memory subarrays, where each memory subarray has a separate address decoder and sense amp arrays. In step 702, a first memory subarray is associated with a first output port during a first time period. In step 704, first data, received at one or more input ports, is written to the first memory subarray.

In step 706, the first data is read from the first memory subarray and output to the first output port during the first time period. In step 708, the first memory subarray is associated with a second output port during a second time period. In step 710, second data, received at the one or more input ports, is written to the first memory subarray.

In step 712, the second data is read from the first memory subarray and output to the second output port during the second time period. In step 714, two or more other memory subarrays are associated with either the first or second output port during a third time period. In step 716, third data, received at the one or more input ports, is written to the two or more other memory subarrays.

Figure 8:
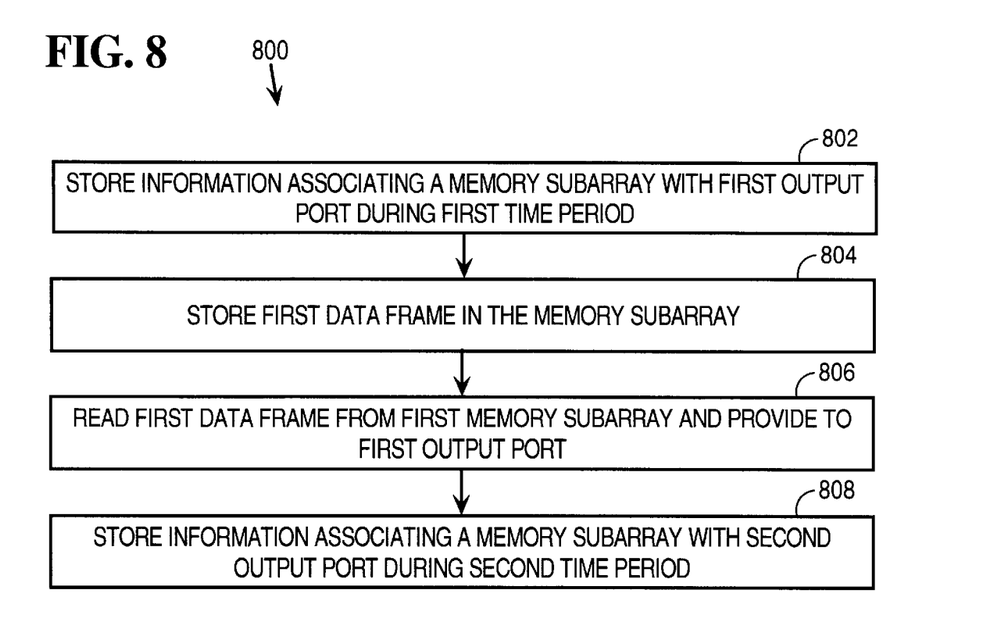
FIG. 8 is a flow diagram that depicts an approach for switching data frames from a first input port to first and second output ports, where the data frames include information that is indicative of the output port for which the data frames are destined.

FIG. 8 is a flow diagram 800 that depicts an approach for switching data frames from a first input port to first and second output ports, where the data frames include information that is indicative of the output port for which the data frames are destined. In step 802, information is stored for associating a memory subarray, from a plurality of memory subarrays, with the first output port during a first time period.

In step 804, a first data frame, destined for the first output ports, is stored in the memory subarray. In step 806, the first data frame is read from the memory subarray and provided to the first output port. In step 808, information is stored for associating the memory subarray with the second output port during a second time period that is different than the first time period.

In light of the above description, a number of advantages of the present can be seen. The present invention provides the ability to dynamically allocate memory resources in a fashion usable in connection with multi-casting, with a substantially reduced need for pointers and accordingly substantially reduced need for bandwidth to achieve the desired read/write operations. The present invention provides for the possibility of allocating in blocks having a size which can contain multiple frames, so that the granularity of allocation is larger than the frame size (thus avoiding the need for providing a separate pointer for each frame). The present invention provides the ability to simultaneously send different addresses to different subarrays of a single memory array. In this way it is possible to achieve parallel writes with respect to portions of memory which are not permanently associated with particular output ports. This leads to the ability to provide, in a multi-casting environment, both dynamic allocation and inherent queuing.

The present invention preferably employs embedded memory technology that allows network switch designers to implement memory subsystems that have advantages of previous memory architectures while reducing or avoiding the disadvantages previously associated with such architectures. The present invention allows dynamic allocation of memory resources based on system requirements while reducing or eliminating a queuing subsystem of the type associated with typical shared memory switch architectures.

A number of variations and modifications of the invention can be used. It is possible to provide an operable (albeit potentially less desirable) embodiment which provides some features of the invention without providing others. For example, it would be possible to construct a system which provided for dynamic allocation of subarrays without performing parallel writes (e.g. by providing a reduced pointer system which is activated only when multicasting capability is needed). Although it is currently believed advantageous to provide memory or subarrays large enough to store numerous frames, such as eight or more frames per subarray, other sizes of subarrays (e.g. relative to frame sizes) can be used. It is possible to combine features of the present invention with features of previous systems, such as providing a port-based or shared memory subsystem associated with some output ports and a system as described herein, associated with other output ports. It is possible to provide subarrays of different sizes, e.g. to permit some relatively smaller subarrays to be used for "fine tuning" allocation to provide the highest efficiency. Although FIGS. 5 and 6 illustrate one fashion of storing information that can be used in connection with the present invention, other methods for storing information can also be provided. For example, it is possible to use the "associated with" information to also indicate the free/not free status of a subarray (eliminating storing a separate "free" flag). It is possible to use the relative values of the read and write pointers 522, 524 to calculate remaining unused buffers 518 (rather than storing this value separately). In addition to the features for facilitating multicasting, subarrays provided, e.g. in embedded memory are also believed useful in enhancing power management, memory performance and detection/correction of manufacturing defects. Although embodiments of the present invention have been described in connection with a network switch as one example of a device with multiple-casting capability, the present invention can also be used in connection with other types of switches and similar devices such as a video switch an ATM switch, a network router, a network gate, a network bridge, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for a memory system useable in connection with a multicasting switch comprising:

a main memory array having a plurality of memory subarrays, each memory subarray from the plurality of memory subarrays having separate address decoder and sense amp arrays;

frame allocation logic circuitry which includes circuitry for associating any or all of said plurality of memory subarrays with any of a plurality of output ports, wherein said circuitry is configured to permit allocation of at least one of said plurality of memory subarrays with a first of said plurality of output ports during a first time period and allocation of said at least one of said plurality of memory subarrays with a second of said plurality of output ports during a second time period; and at least first and second different address lines coupled to address decoders of at least first and second different memory subarrays from the plurality of memory subarrays, wherein data, received in a least a first input port, may be written, in parallel, to the first and second different memory subarrays.

2. Apparatus as claimed in claim 1, wherein said main memory array and said frame allocation logic circuitry are provided as a single integrated circuit, to provide an embedded memory system.

3. Apparatus as claimed in claim 1, further comprising output arbitration logic, including circuitry configured to provide data, read from said main memory array to any one of said plurality of output ports.

4. Apparatus for a memory system useable in connection with a multicasting switch comprising:

a main memory array having a plurality of memory subarrays, each memory subarray from the plurality of memory subarrays having separate address decoder and sense amp arrays;

means for associating any or all of said plurality of memory subarrays with any one of a plurality of output ports, wherein said means for associating is configured to permit allocation of at least one of said plurality of memory subarrays with a first of said plurality of output ports during a first time period and allocation of said at least one of said plurality of memory subarrays with a second of said plurality of output ports during a second time period; and at least first and second different address means, coupled to address decoders of at least first and second different memory subarrays from the plurality of memory subarrays for writing data, received in a least a first input port, in parallel, to the first and second different memory subarrays.

5. Apparatus as claimed in claim 4, wherein said main memory array and said means for associating are provided as a single integrated circuit, to provide an embedded memory system.

6. Apparatus as claimed in claim 4, further comprising output means, for providing data, read from said main memory array to any one of said plurality of output ports.

7. A method for switching data in a main memory array having a plurality of memory subarrays, wherein each memory subarray has a separate address decoder and sense amp arrays, the method comprising:

associating a first of said plurality of memory subarrays with a first output port during a first time period;

writing first data, received in one or more input ports, to memory locations in said first memory subarray;

reading the first data from said memory locations in said first memory subarray and outputting the first data to said first output port, during said first time period;

associating the first memory subarray with a second output port during a second time period;

writing second data, received in the one or more input ports, to the memory locations in said first memory subarray;

reading the second data from said memory locations in said first memory subarray and outputting the second data to said second output port, during said second time period;

associating two or more other memory subarrays from the plurality of memory subarrays with either the first or second output port during a third time period; and writing third data, received in the one or more input ports, in parallel, to memory locations in said two or more other memory subarrays.

8. A method for switching data frames from a first input port to first and second output ports, said data frames including information indicative of the output port for which the data frames are destined, the method comprising:

storing information for associating a memory subarray from a plurality of memory subarrays with said first output port during a first time period;

storing a first data frame, destined for said first output port, in the memory subarray; reading said first data frame from said memory subarray and providing said first data frame to said first output port; and storing information for associating said memory subarray with said second output port during a second time period, different from said first time period.

9. A method as claimed in claim 8 further comprising writing a second data frame received at said first port, in parallel, to at least first and second different memory subarrays from the plurality of memory subarrays, wherein said first and second different memory subarrays have been associated with said first and second output ports respectively.

10. Apparatus for switching data frames from an input port to selectable ones of at least first and second output ports, said data frames including information indicative of the output port for which the frames are destined, comprising:

a memory including a plurality of separately addressable memory subarrays;

means for storing information, associating a first memory subarray from said plurality of separately addressable memory subarrays with the first output port during a first time period;

means for storing at least a first data frame, destined for said first output port, in the first memory subarray;

means for reading said first data frame from said first memory subarray and providing said first data frame to said first output port; and means for storing information, associating said first memory subarray with said second output port during at least a second time period, different from said first time period.

11. Apparatus, as claimed in claim 10, further comprising means for writing a data frame received at said input port, in parallel, to at least first and second other memory subarrays from said plurality of separately addressable memory subarrays, wherein said first and second other memory subarrays have been associated with said first and second output ports respectively.

* * * * *